United States Patent
Natsugari et al.

(10) Patent No.: US 7,098,158 B2
(45) Date of Patent: Aug. 29, 2006

(54) GLASS FOR PRESS MOLDING, AND LENS

(75) Inventors: Norio Natsugari, Yokohama (JP); Koichi Murata, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 107 days.

(21) Appl. No.: 10/419,724

(22) Filed: Apr. 22, 2003

(65) Prior Publication Data

US 2003/0191006 A1 Oct. 9, 2003

Related U.S. Application Data

(63) Continuation of application No. PCT/JP01/09252, filed on Oct. 22, 2001.

(30) Foreign Application Priority Data

Oct. 23, 2000 (JP) .............................. 2000-322819

(51) Int. Cl.
- C03C 3/068 (2006.01)
- C03C 3/066 (2006.01)
- C03C 3/15 (2006.01)
- C03C 3/095 (2006.01)

(52) U.S. Cl. ............................ 501/78; 501/50; 501/64; 501/79

(58) Field of Classification Search ............ 501/49–52, 501/73, 78, 79, 64
See application file for complete search history.

(56) References Cited

U.S. PATENT DOCUMENTS

| | | | | |
|---|---|---|---|---|
| 3,867,303 A | * | 2/1975 | Shaw et al. ............. | 252/301.6 P |
| 5,733,828 A | * | 3/1998 | Usui et al. ............... | 501/17 |
| 6,255,239 B1 | * | 7/2001 | Sakoske ................. | 501/77 |
| 6,599,852 B1 | * | 7/2003 | Kondo et al. ........... | 501/42 |
| 6,599,853 B1 | * | 7/2003 | Sugimoto et al. ....... | 501/50 |
| 6,620,748 B1 | * | 9/2003 | Sugimoto et al. ....... | 501/64 |
| 6,653,251 B1 | * | 11/2003 | Sugimoto et al. ....... | 501/78 |
| 6,656,584 B1 | * | 12/2003 | Sugimoto et al. ....... | 428/392 |
| 6,778,355 B1 | * | 8/2004 | Hasegawa et al. ...... | 360/125 |
| 2005/0037913 A1 | * | 2/2005 | Peuchert et al. ........ | 501/78 |

FOREIGN PATENT DOCUMENTS

| | | |
|---|---|---|
| JP | 8-225339 | 9/1996 |
| JP | 9-142872 | 6/1997 |
| JP | 63-274638 | 11/1998 |
| WO | WO 200023392 A1 * | 4/2000 |
| WO | WO 200185631 A1 * | 11/2001 |
| WO | WO 2003022755 A2 * | 3/2003 |

OTHER PUBLICATIONS

D. Ehrt, Glass Technology, vol. 41, No. 6, pp. 182-185, "Structure, Properties and Applications of Borate Glasses", Dec. 2000.

* cited by examiner

*Primary Examiner*—J. A. Lorengo
*Assistant Examiner*—Elizabeth A. Bolden
(74) *Attorney, Agent, or Firm*—Oblon, Spivak, McClelland, Maier & Neustadt, P.C.

(57) ABSTRACT

A glass for press molding, containing substantially no lead, consisting substantially of, as represented by mol % based on oxides:

| | |
|---|---|
| $Bi_2O_3$ | 25 to 70%, |
| $B_2O_3 + SiO_2$ | 5 to 75%, |
| $CeO_2$ | 0 to 10%, |
| $Al_2O_3$ | 0 to 20%, |
| $Ga_2O_3$ | 0 to 20%, |
| $Al_2O_3 + Ga_2O_3$ | 0 to 30%, and |
| $ZnO + TeO_2 + BaO + WO_3$ | 0 to 40%, | and having a refractive index of at least 1.9 to a light having a wavelength of 0.8 μm.

10 Claims, No Drawings

GLASS FOR PRESS MOLDING, AND LENS

This application is a Continuation of International Application No. PCT/JP01/09252, filed Oct. 22, 2001.

TECHNICAL FIELD

The present invention relates to a glass for press molding, which contains substantially no lead as a component and which has a low deformation point and a high refractive index to a light having a wavelength of 0.8 μm, and a lens prepared by press molding such a glass.

BACKGROUND ART

The material of optical glass to be used for an instrument utilizing light, such as a lens, is desired to have characteristics such that it has a refractive index as high as possible and a deformation point as low as possible. If the material has a high refractive index, the optical design can advantageously be made, and if the deformation point is low, a lens can be produced at a low cost by press molding. Here, the deformation point is the temperature at which expansion of glass along with the temperature rise stops and shrinkage starts, and it substantially corresponds to the temperature at which glass becomes moldable. In recent years, in addition to these characteristics, the material is desired to be composed of components containing substantially no lead with a view to facilitating e.g. disposal of waste materials.

However, many of conventional glasses for press molding have been developed on the premise that they will be used mainly in a visible light range, and no glass has been found which satisfies three conditions i.e. a no lead content, a low deformation point and a high refractive index to a light having a long wavelength, particularly a wavelength at a level of from 0.8 to 1.8 μm. Among conventional glass materials for press-molded lenses, there have been some which have reached to a level of a deformation point of 543° C. and a refractive index of about 1.88 to a wavelength of about 0.8 μm, with no lead content. However, there has been no glass material which satisfies both a refractive index higher than this and a deformation point lower than this on the premise that it contains no lead.

The first object of the present invention is to provide a glass for press molding which contains substantially no lead and which has a low deformation point and a refractive index of at least 1.9 to a light having a wavelength of 0.8 μm, and the second object is to present a lens prepared by press molding such a glass.

DISCLOSURE OF THE INVENTION

The present invention provides a glass for press molding, containing substantially no lead, consisting substantially of, as represented by mol % based on oxides:

| | |
|---|---|
| $Bi_2O_3$ | 25 to 70%, |
| $B_2O_3 + SiO_2$ | 5 to 75%, |
| $CeO_2$ | 0 to 10%, |
| $Al_2O_3$ | 0 to 20%, |
| $Ga_2O_3$ | 0 to 20%, |
| $Al_2O_3 + Ga_2O_3$ | 0 to 30%, and |
| $ZnO + TeO_2 + BaO + WO_3$ | 0 to 40%, | and having a refractive index of at least 1.9 to a light having a wavelength of 0.8 μm.

BEST MODE FOR CARRYING OUT THE INVENTION

The glass for press molding of the present invention contains substantially no lead. Here, "contains substantially no" means the content is not higher than an impurity level. Specifically, 0.1 mol % (hereinafter referred to simply as %) or less, may be regarded as "contains substantially no".

The glass for press molding of the present invention contains from 25 to 70 mol % of $Bi_2O_3$. If the content is less than 25%, the desired high refractive index may not be obtained. It is preferably at least 30%, more preferably at least 38%. On the other hand, if it exceeds 70%, vitrification tends to be difficult, or devitrification may take place during the molding. It is preferably at most 60%, more preferably at most 55%, particularly preferably at most 48%.

$B_2O_3$ and $SiO_2$ are network formers, and at least either one of them is contained. If their total amount is less than 5%, vitrification tends to be difficult, or devitrification may take place during the molding. Their total amount is preferably at least 20%, more preferably at least 25%, particularly preferably at least 30%, most preferably at least 40%. If their total amount exceeds 75%, devitrification tends to take place during the molding. It is preferably at most 70%, more preferably at most 65%, particularly preferably at most 60%.

Further, when $SiO_2$ is incorporated, the chemical stability can be improved. Particularly, it is possible to improve the moisture resistance and to obtain a glass strong against weathering. Accordingly, it is preferred to incorporate $SiO_2$ as the above-mentioned network former. Preferably, $SiO_2$ is incorporated in an amount of at least 5%, more preferably at least 10%.

$CeO_2$ is not essential, but has an effect to suppress deterioration of the transparency of the glass by precipitation of $Bi_2O_3$ in the glass composition as metal bismuth in the molten glass, and it may be incorporated within a range of up to 10%. If it exceeds 10%, vitrification may tend to be difficult. It is more preferably at most 5%, particularly preferably at most 1%. When $CeO_2$ is incorporated for the purpose of suppressing precipitation of metal bismuth, its content is preferably at least 0.01%, more preferably at least 0.05%, most preferably at least 0.1%.

On the other hand, if $CeO_2$ is incorporated, coloration to yellow or orange tends to increase, whereby the transmittance of the glass is likely to deteriorate. In an application where a high light transmittance is required, the content of $CeO_2$ is preferably at most 0.15%, particularly preferably at most 0.1%.

$Al_2O_3$ is not essential, but has an effect to suppress devitrification during the molding, and it may be incorporated within a range of up to 20%. If it exceeds 20%, the transparency is likely to deteriorate due to devitrification. It is more preferably at most 15%, particularly preferably at most 11%. When $Al_2O_3$ is incorporated, its content is more preferably at least 0.1%, particularly preferably at least 1%, most preferably at least 2%.

$Ga_2O_3$ is not essential, but has an effect to suppress devitrification during the molding, and it may be incorporated within a range of up to 20%. If it exceeds 20%, the transparency is likely to deteriorate due to devitrification. It is more preferably at most 18%, particularly preferably at most 15%, most preferably at most 10%. When $Ga_2O_3$ is incorporated, its content is more preferably at least 0.1%, particularly preferably at least 1%, most preferably at least 2%.

Further, the total of contents of $Al_2O_3$ and $Ga_2O_3$ is at most 30%. If the total amount exceeds 30%, the transparency is likely to deteriorate due to devitrification. It is preferably at most 25%, particularly preferably at most 20%, most preferably at most 15%. In a case where at least either one of $Al_2O_3$ and $Ga_2O_3$ is contained, the total of the contents of the two is preferably at least 2%, particularly preferably at least 4%.

Any of ZnO, $TeO_2$, BaO and $WO_3$ is not essential, but in order to adjust the physical properties (the refractive index, the thermal expansion coefficient, etc.) or to facilitate vitrification, they may be incorporated in their total content of up to 40%. The total content is more preferably at most 20%, particularly preferably at most 10%.

The glass for press molding of the present invention may contain other components in a total amount within a range of at most 10%, so long as the effect of the present invention will not be impaired. For example, in order to suppress devitrification during the molding or to facilitate vitrification, BeO, MgO, CaO, SrO, $Li_2O$, $Na_2O$, $K_2O$, $Cs_2O$, $La_2O_3$, $TiO_2$, $GeO_2$, $ZrO_2$, CdO or $In_2O_3$ may, for example, be incorporated.

Further, if an alkali component such as $Li_2O$, $Na_2O$ or $K_2O$ is incorporated in a large amount, the composition tends to be readily crystallizable, whereby the devitrification property tends to increase, and molding of the glass tends to be difficult. Further, such an alkali component tends to lower the refractive index. For these reasons, the total amount of $Li_2O$, $Na_2O$ and $K_2O$ is preferably at most 8%, more preferably at most 5%, and it is particularly preferred that substantially no alkali component is contained.

Further, the glass for press molding of the present invention has a refractive index of at least 1.9 to a light having a wavelength of 0.8 μm, and as such, it is advantageous for optical designing and is suitable as an optical glass. The refractive index to a light having a wavelength of 0.8 μm, is preferably at least 2.0.

Further, for the glass for press molding of the present invention to be useful for a light having a long wavelength, the refractive index in the entire wavelength range of from 0.8 to 1.55 μm is at least 1.9, and this refractive index is more preferably at least 2.0. Especially for the glass for press molding of the present invention to be useful for a light having a very long wavelength, the refractive index in the entire wavelength range of from 0.8 to 1.8 μm is preferably at least 1.9, and such a refractive index is most preferably at least 2.0.

Further, in order to facilitate press molding, the glass for press molding of the present invention preferably has a deformation point of at most 540° C. The deformation point is more preferably at most 450° C. The deformation point can be measured specifically as follows. Namely, in a differential dilatometer having the temperature in furnace maintained to a precision of ±1° C., a quartz having a diameter of 4 mm and a length of 20 mm, as a standard sample, and the glass for press molding of the same shape, as a sample to be measured, are set, and the temperature is raised at a rate of 10° C./min, whereby the change in the expansion rate is detected.

Further, the glass for press molding of the present invention typically has a glass transition point of at most 510° C. The glass transition point is preferably at most 450° C., particularly preferably at most 420° C.

The glass for press molding of the present invention may be prepared, for example, as follows. Materials are mixed, put into a crucible made of e.g. platinum, alumina, quartz or iridium and melted in the air of from 800 to 1,300° C., and the obtained melt is cast in a prescribed mold.

Further, a press-molded lens can be obtained by sampling a prescribed amount of glass from the obtained glass chunk, followed by processing into a spherical or cylindrical preform and then by press molding by means of a mold. Here, molten glass may be separated into a suitable amount via a nozzle and formed into one having a substantially spherical shape (so-called gob) without being processed, which may be used as a preform.

Now, the present invention will be described with reference to Examples, but it should be understood that the present invention is by no means restricted to such Examples.

A glass for press molding having a composition (unit: mol %) as identified in Table 1, was prepared. In Table 1, "B+Si" means the total amount of $B_2O_3$ and $SiO_2$, and "Al+Ga" means the total amount of $Al_2O_3$ and $Ga_2O_3$. "ZnTeBaW" means the total amount of ZnO, $TeO_2$, BaO and $WO_3$. The glass composition was obtained by a fluorescent X-ray method.

With respect to such a glass, the deformation point (unit: ° C.) was shown at "At" in Table 1. The deformation point was obtained by setting a quartz having a diameter of 4 mm and a length of 20 mm as the standard sample and the glass for press molding of the same shape as the sample to be measured, in a differential dilatometer having the temperature in furnace maintained to a precision of ±1° C., raising the temperature at a rate of 10° C./min, and detecting the inflection point in the change of the expansion rate. Further, for the moisture resistance, a sample was left to stand in an atmosphere of 80° C. under a humidity of 90% for 48 hours, whereupon the change in the surface state (the haze) was visually observed. One showing moisture resistance higher than dense barium crown glass evaluated as a standard sample, was identified by symbol ○, and one showing equivalent moisture resistance, was identified by symbol Δ. However, in the Table, the deformation points of glasses of Examples 3 to 11 were obtained by simulation. Further, within the range of the present invention, the relation between At and Tg has an interrelation, and approximately, At−Tg=40 to 50° C.

Further, with respect to such a glass for press molding, the refractive index to a light having a wavelength of 1.55 μm, was shown in the line for "refractive index" in Table 1. In general, the refractive index of glass simply decreases, and the rate of such decrease becomes small, as the wavelength increases, within a wavelength range of from 0.8 to 1.8 μm. Accordingly, it is considered that the lowest value of the refractive index of a light within a wavelength range of from 0.8 to 1.55 μm can be roughly represented by the refractive index to a light having a wavelength of 1.55 μm. Further, if the refractive index at a wavelength of 1.55 μm exceeds 2.0, it is assumed that the refractive index exceeds 1.9 in the entire wavelength range of from 0.8 to 1.8 μm. With respect to glasses of Examples 1 and 2, the refractive indices were measured by an ellipsometer. The refractive indices of glasses of Examples 3 to 7 were obtained by simulation.

Further, with respect to glasses for press molding of Examples 1 and 2, the glass transition points (unit: ° C.) were measured by a differential thermal analysis, and the results are shown in the line for "Tg" in Table 1.

Further, the glass having the composition of Example 1 in Table 1, was press-molded into a lens. The effective diameter of the lens was 1 mm, and the effective NA (numerical aperture) was 0.6. From a glass melt, chunk glass was cut out and polished to have a spherical shape thereby to obtain a preform. The press molding temperature was about 465° C., and a lens having excellent properties with a wavefront aberration of at most 0.05 λ (λ=1.55 μm) was thereby obtained.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Composition |  |  |  |  |  |  |  |  |  |  |  |
| $Bi_2O_3$ | 42.8 | 42.8 | 42.7 | 42.7 | 42.7 | 42.8 | 40.4 | 42.8 | 42.8 | 42.8 | 42.8 |
| $B_2O_3$ | 28.5 | 0 | 28.7 | 28.5 | 28.5 | 27.0 | 1.2 | 28.5 | 28.5 | 28.5 | 0 |
| $SiO_2$ | 14.3 | 35.6 | 0 | 21.4 | 21.6 | 20.0 | 19.8 | 14.3 | 14.3 | 14.3 | 35.6 |
| $CeO_2$ | 0.2 | 0.2 | 0.1 | 0.2 | 0 | 0 | 0 | 0.2 | 0.2 | 0.2 | 0.2 |
| $Al_2O_3$ | 10.6 | 7.1 | 0 | 0 | 0 | 1.0 | 1.9 | 7.1 | 3.6 | 0 | 3.6 |
| $Ga_2O_3$ | 3.6 | 14.3 | 0 | 0 | 0 | 0 | 19.3 | 7.1 | 10.7 | 14.3 | 17.8 |
| ZnO | 0 | 0 | 28.5 | 0 | 0 | 0 | 0 | 0 | 0 | 0 | 0 |
| $TeO_2$ | 0 | 0 | 0 | 7.2 | 0 | 0 | 10.1 | 0 | 0 | 0 | 0 |
| BaO | 0 | 0 | 0 | 0 | 7.2 | 0 | 0 | 0 | 0 | 0 | 0 |
| $WO_3$ | 0 | 0 | 0 | 0 | 0 | 7.4 | 1.8 | 0 | 0 | 0 | 0 |
| $TiO_2$ | 0 | 0 | 0 | 0 | 0 | 0 | 5.5 | 0 | 0 | 0 | 0 |
| $GeO_2$ | 0 | 0 | 0 | 0 | 0 | 1.8 | 0 | 0 | 0 | 0 | 0 |
| PbO | 0 | 0 | 0 | 0 | 0 | 0 | 0 | 0 | 0 | 0 | 0 |
| B + Si | 42.8 | 35.6 | 28.7 | 49.9 | 50.1 | 47.0 | 21.0 | 42.8 | 42.8 | 42.8 | 35.6 |
| Al + Ga | 14.2 | 21.4 | 0 | 0 | 0 | 1.0 | 21.2 | 14.2 | 14.3 | 14.3 | 21.4 |
| Zn + Te + Ba + W | 0 | 0 | 28.5 | 7.2 | 7.2 | 7.4 | 11.9 | 0 | 0 | 0 | 0 |
| Properties |  |  |  |  |  |  |  |  |  |  |  |
| At | 462 | 529 | 407 | 444 | 443 | 462 | 487 | — | — | — | — |
| Refractive index | 2.02 | 2.03 | 2.03 | 2.03 | 2.02 | 2.01 | 2.05 | 2.04 | 2.06 | 2.07 | 2.01 |
| Tg | 420 | 486 | — | — | — | — | — | 422 | 419 | 418 | 485 |
| Moisture resistance | ○ | ○ | Δ | ○ | ○ | ○ | ○ | ○ | ○ | ○ | ○ |

INDUSTRIAL APPLICABILITY

According to the present invention, it is possible to obtain a glass for press molding which contains substantially no lead and has a refractive index of at least 1.9 to a light having a wavelength of 0.8 μm and which has a low deformation point. This glass is suitable for press molding. Accordingly, a lens can be produced at a low cost.

The entire disclosure of Japanese Patent Application No. 2000-322819 filed on Oct. 23, 2000 including specification, claims and summary is incorporated herein by reference in its entirety.

What is claimed is:

1. A glass for press molding, containing substantially no lead, consisting essentially of, as represented by mol % based on oxides:

| | |
|---|---|
| $Bi_2O_3$ | 25 to 70%, |
| $B_2O_3 + SiO_2$ | 5 to 75%, |
| $CeO_2$ | 0.01 to 10%, |
| $Al_2O_3$ | 0 to 20%, |
| $Ga_2O_3$ | 0 to 20%, |
| $Al_2O_3 + Ga_2O_3$ | 0 to 30%, and |
| $ZnO + TeO_2 + BaO + WO_3$ | 0 to 40%, | and having a refractive index of at least 1.9 to a light having a wavelength of 0.8 μm.

2. The glass for press molding according to claim 1, which contains substantially no lead and consisting essentially of, as represented by mol % based on oxides:

| | |
|---|---|
| $Bi_2O_3$ | 30 to 60%, |
| $B_2O_3 + SiO_2$ | 20 to 70%, |
| $CeO_2$ | 0.01 to 5%, |
| $Al_2O_3$ | 0 to 15%, |
| $Ga_2O_3$ | 0 to 20%, |
| $Al_2O_3 + Ga_2O_3$ | 0 to 25%, and |
| $ZnO + TeO_2 + BaO + WO_3$ | 0 to 35%. |

3. The glass for press molding according to claim 1, which contains substantially no lead and consisting essentially of, as represented by mol % based on oxides:

| | |
|---|---|
| $Bi_2O_3$ | 38 to 55%, |
| $B_2O_3 + SiO_2$ | 30 to 60%, |
| $CeO_2$ | 0.01 to 1%, |
| $Al_2O_3$ | 0 to 11%, |
| $Ga_2O_3$ | 0 to 18%, |
| $Al_2O_3 + Ga_2O_3$ | 0 to 25%, and |
| $ZnO + TeO_2 + BaO + WO_3$ | 0 to 20%. |

4. The glass for press molding according to claim 1, wherein the amount of components excluding $Bi_2O_3$, $B_2O_3$, $SiO_2$, $CeO_2$, $Al_2O_3$, $Ga_2O_3$, ZnO, $TeO_2$, BaO and $WO_3$, is at most 10%.

5. The glass for press molding according to claim 1, which has a refractive index of at least 1.9 to a light having a wavelength of from 0.8 to 1.55 μm.

6. The glass for press molding according to claim 1, which has a refractive index of at least 1.9 to a light having a wavelength of from 0.8 to 1.8 μm.

7. The glass for press molding according to claim 1, which has a glass transition point of at most 510° C.

8. The glass for press molding according to claim 1, which has a deformation point of at most 540° C.

9. The glass for press molding according to claim 1, wherein the total amount of $Li_2O$, $Na_2O$ and $K_2O$ is at most 8%.

10. A lens prepared by press molding the glass for press molding as defined in claim 1.

* * * * *